Patented Aug. 26, 1924.

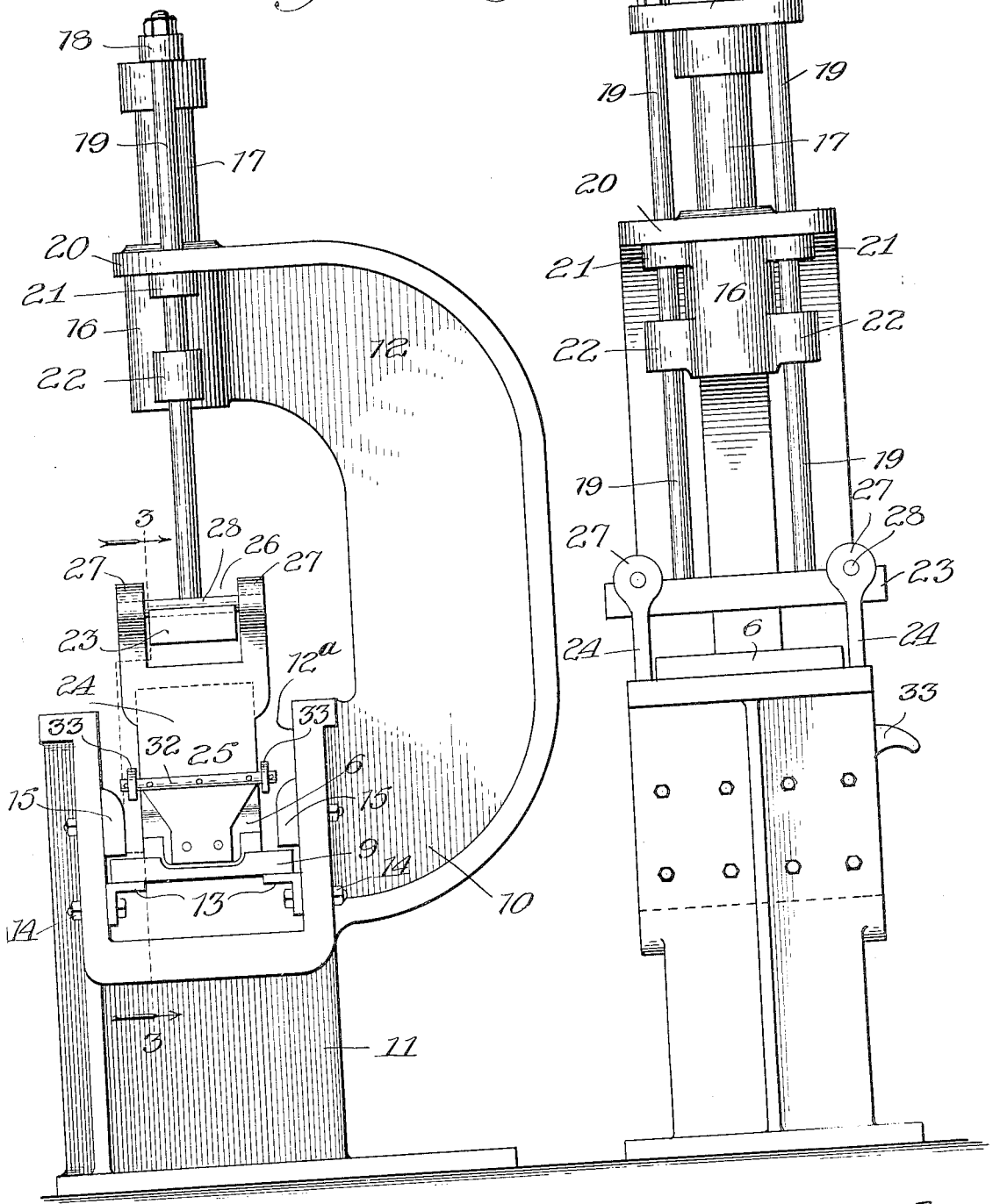

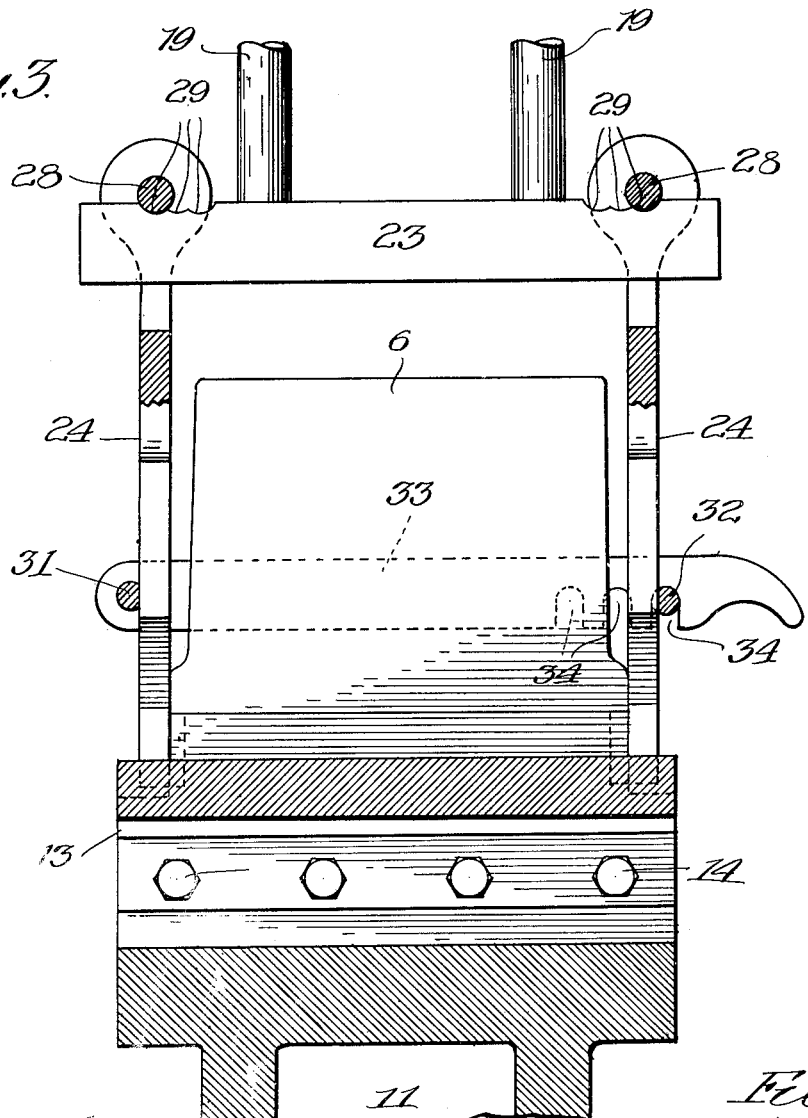
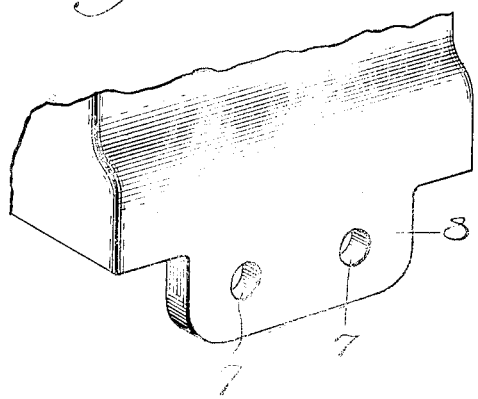
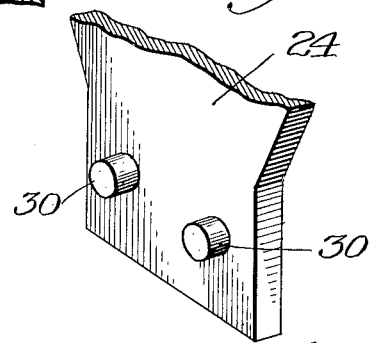

1,506,214

UNITED STATES PATENT OFFICE.

MARINO BELLO, OF HIGHLAND PARK, AND JACK J. BRETSON, OF WAUKEGAN, ILLINOIS, ASSIGNORS TO AHLBELL BATTERY CONTAINER CORPORATION, OF WAUKEGAN, ILLINOIS, A CORPORATION OF ILLINOIS.

ART OF MANUFACTURING CONTAINERS.

Application filed May 8, 1922. Serial No. 559,357.

*To all whom it may concern:*

Be it known that we, MARINO BELLO, a subject of the King of Italy, residing at Highland Park, in the county of Lake and State of Illinois, and JACK J. BRETSON, a citizen of the United States, residing at Waukegan, in the county of Lake and State of Illinois, have invented a new and useful Improvement in the Art of Manufacturing Containers, of which the following is a specification.

Our invention relates to the manufacture of containers, such as, for example, are provided to receive the battery elements of storage batteries and form containers therefor and for the electrolytes. The invention has particular reference to the manufacture of containers which are molded about a core structure and which require, for their removal from the core structure, the exertion of considerable force, this being the case especially where the containers are formed of material, such as a vulcanizable compound, and are molded under high pressure.

Our primary objects are to so improve upon the methods of manufacture hitherto practiced, and the constructions of apparatus hitherto used, as to reduce the cost of manufacturing containers and render relatively easy the operation of stripping the containers from the core structures.

Referring to the accompanying drawings:

Figure 1 is a view in end elevation of a machine embodying our invention and of a construction suitable for practicing our improved method. Figure 2 is a view in front elevation of the machine of Fig. 1. Figure 3 is an enlarged, broken, section taken at the irregular line 3—3 on Fig. 1 and viewed in the direction of the arrows; the above-referred-to figures illustrating, in the machine, an assembled core structure and container of the apertured handle-portion-equipped type, from which core structure the container is to be removed. Figure 4 is a broken, perspective, view of one of the similar handle-equipped portions of the illustrated container; and Figure 5, a similar view of one of the similar members of the apparatus for cooperation with the apertured handle-portions of the container.

As a preface to the following description, it may be stated that in the forming of containers in connection with which we have more particularly devised our invention, the container is formed in a mold comprising a core structure supported on a plate which latter extends outwardly beyond the core structure, and a removable, surrounding, wall structure and top plate, this wall structure and top plate being spaced from the core structure to form, with said core structure and the supporting plate referred to, the mold cavity in which the container is to be formed. The mold cavity is of such shape as to provide for the formation on opposed walls of the container of apertured handle portions which extend above the upper edges of the open top of the formed container, the mold for forming the containers, when the handle portions thereof are integral with the walls carrying them, having other core-portions about which the material forming the handle portions is molded, these core portions being removable. In the molding of containers in molds as stated, the wall-forming and top-forming portions of the molds, after the containers have been formed therein, are removed in any desirable way, and where the aperture-forming cores referred to are used as above stated these cores are removed, leaving the container on the combined core structure and bottom plate from which the container is to be stripped, and the openings in the handle portions of the container, free.

In the illustrated showing of our invention, a container of the general character above referred to is represented at 6, the handle portions thereof, apertured as indicated at 7, being represented at 8. The container is shown as in inverted condition and surrounding the main core structure about which it is formed in the molding of the container, this core structure (not shown) being carried by the plate represented at 9 and forming a part of the mold structure.

Referring now to the particular, illustrated, machine which is of the lift-press type, the frame of the machine is represented at 10, this frame being formed of the upwardly-extending lower portion 11 from which the yoke-shaped portion 12 of the frame, upwardly extends. The body portion 11 of the frame contains in its upper surface a recess, represented at $12^a$, the opposed walls of which are provided with inwardly-extending ledges 13 shown as formed of angle bars secured to the walls of the recess 12ª, as by the bolts 14. Located in the recess 12ª above the ledges 13, and in spaced relation thereto, are abutment members 15 which are spaced apart a distance greater than the width of the formed container 6, but of less width than that of the plate 9. The ledges 13 form a support for the plate 9 carrying the core structure and container formed thereon to position it in the machine as shown in Fig. 1, in which position the abutment blocks 15 extend directly above the opposite marginal edge portions of the plate 9.

In the particular arrangement shown the upper leg portion of the yoke member 12 is in the form of a hydraulic cylinder 16, in accordance with lift presses as commonly provided, and sliding in this cylinder is a piston, the upwardly-extending stem of which, represented at 17, is connected with a cross member 18 which in turn is connected with the upper ends of guide rods 19 which are guided, for vertical movement, in the bearing portions 20, 21 and 22 of the member 12. The lower ends of the rods 19 are connected with a head 23 which is positioned to extend above the recess 12ª and in vertical alignment therewith, as shown. The head 23 which is raised and lowered, as desired, through the medium of the hydraulic piston and cylinder mechanism referred to, the fluid pressure connections between the cylinder 16 and the source of supply, being omitted, as this type of device is commonly known in the art, cooperates with members adapted for interlockingly engaging the apertured portions 7 of the hanldes 8, for the purpose of applying to the formed container 6, the force for stripping the latter from the core-structure, the abutment blocks 15 operating to hold the core-structure and plate 9 against vertical movement during this stripping operation.

In the particular machine shown the handle-engaging members referred to are hung from the head 23 in a manner to permit them to be relatively swung on the head into and out of interlocking position relative to the apertured portions of the handles 8, and also adjusted on the head to adapt the machine for use with containers of different sizes. Each of the members above referred to, and represented at 24, is in the form of a plate 25, the upper portion of which is recessed, as represented at 26, to adapt it to straddle at the arms 27 thereby provided, the end of the head 23, the arms 27 of the members 24 supporting cross-shafts 28 through the medium of which the members 24 are supported from the head 23. The members 24 are located at opposite ends of the head 23 and adjacent opposite ends of the container to be stripped, and for the purpose of permitting of the relative adjustment of the members 24 toward and away from each other on the head 23, the upper surface of the latter, adjacent its opposite ends, contains a series of grooves 29 extending crosswise thereof and into any of which the cross-shafts 28 may be positioned. The lower ends of the members 24 are provided with projections adapted to be introduced into the apertured portions of the handles 8 and interlockingly engaged therewith, for the purpose hereinbefore stated, these projections, in the particular arrangement shown, and wherein each handle 8 contains a pair of finger openings 7, being provided of the same number as the number of openings 7. Means are provided for holding the members 24 against lateral movement to prevent disengagement of the projections 30 from the apertures 7, in the operation of stripping the container, these means in the particular construction shown, comprising cross-bars 31 and 32 secured, in any desirable manner, to the members 24, respectively, and latch-levers 33 each fulcrumed at one end on the cross-bar 31. The levers 33 are located at opposite sides of the container 6 and their outer ends contain series of downwardly-opening recesses 34 adapted to receive the cross-bar 31 in the swinging of the levers 33 to latching position. The recesses 34 are so disposed that in the various adjustments of the members 24 at their shaft portions 28 with the head 23, the desired latching function may be performed by the levers 33.

It will be understood from the foregoing that by employing our invention the stripping operation is positively and economically effected and results in the production of containers at substantially less cost than where the methods hitherto employed are used.

While we have illustrated and described a particular machine for practicing our improved method and have shown our invention as incorporated in a particular construction of machine, we do not wish to be understood as intending to limit it thereto, as the method may be practiced by the employment of other apparatus and the machine shown may be variously modified and altered without departing from the spirit of the invention.

What we claim as new, and desire to secure by Letters Patent, is:

1. In the art of manufacturing containers formed upon cores and having apertured handle-equipped portions, the method of stripping the container from the core which consists in engaging the container at its apertures and engaging the portion of the mold from which the container is to be removed, and exerting force through such engagement, for relatively moving said container and mold-portion to effect the stripping of the container from the core.

2. In the art of manufacturing containers formed upon cores and having apertured handle-equipped portions, the method of stripping the container from the core which consists in holding against movement the portion of the mold from which the container is to be stripped, and exerting force at the apertured portions of the handles for removing the container from the core structure.

3. In apparatus for separating containers of relatively fragile material from a mold portion associated therewith, the combination of members relatively movable toward and away from each other, one for engagement with the portion of the mold from which the container is to be stripped and the other for engagement with the container, said last-referred-to member being formed of portions which are relatively movable in a direction crosswise of said container and are adapted to lap portions of the latter and when so applied said portions extending from their points of support to their points of engagement with the container substantially parallel with the plane in which the movable one of said members moves in the separating operation, and means for effecting relative movement of said members to perform the stripping function.

4. In apparatus of the character set forth, the combination of members relatively movable toward and away from each other, one for engagement with the portion of the mold from which the container is to be stripped and the other for engagement with the container, said last-referred-to member being formed of portions which are relatively movable in a direction crosswise of said container and are adapted to lap portions of the latter and when so applied said portions extending from their points of support to their points of engagement with the container substantially parallel with the plane in which the movable one of said members moves in the separating operation, means for effecting relative movement of said members to perform the stripping function, and releasable means engaging said portions for preventing disengagement of the latter from the container.

5. In apparatus for stripping apertured handle-portion-equipped containers from the core portions of molds, the combination of members relatively movable toward and away from each other, one for engagement with the portion of the mold from which the container is to be stripped and the other for engagement with the container at the apertures in the handle portions of the latter, said last-referred-to member being formed of portions which are relatively movable in a direction crosswise of said container and are adapted to be positioned in said apertures and when so applied said portions extending from their points of support to their points of engagement with the container substantially parallel with the plane in which the movable one of said members moves in the separating operation, and means for effecting relative movement of said members to perform the stripping function.

6. In apparatus of the character set forth, the combination of members relatively movable toward and away from each other, one for engagement with the portion of the mold from which the container is to be stripped and the other for engagement with the container, said last-referred-to member being formed of portions which are relatively movable in a direction crosswise of said container and are adapted to lap portions of the latter, means for effecting relative movement of said members to perform the stripping function, and releasable means holding said portions in lapped engagement with said container.

7. In apparatus for stripping apertured handle-portion-equipped containers from the core portions of molds, the combination of members relatively movable toward and away from each other, one for engagement with the portion of the mold from which the container is to be stripped and the other for engagement with the container at the apertures in the handle portions of the latter, said last-referred-to member being formed of portions which are relatively movable in a direction crosswise of said container and are adapted to be positioned in said apertures, means for effecting relative movement of said members to produce the stripping function, and releasable means holding said portions in engagement with the apertured portions of the handles of the container.

8. In apparatus for separating containers of relatively fragile material from a mold portion associated therewith, the combination of members relatively movable toward and away from each other, one for engagement with the portion of the mold from which the container is to be stripped and the other for engagement with the container and comprising a head and elements swingingly mounted thereon to move in a direction crosswise of the container, said elements being adapted to lap portions of the container, the parts being so constructed and arranged that said elements extend from their points of support to their points of engagement with the container substantially parallel with the plane in which the movable one of said members moves in the separating operation, and means for effecting relative movement of said members to perform the stripping function.

9. In apparatus of the character set forth, the combination of a base member for receiving the core-equipped portion of the mold with a container thereon and having portions overlapping portions interlockingly of said mold, a head supported to be movable toward and away from said first-referred-to member, and elements engaging said head and relatively movable thereon in a direction crosswise of said container and adapted to lap portions of said container, and means for actuating said head.

10. In apparatus for separating containers of relatively fragile material from a mold portion associated therewith, the combination of members relatively movable toward and away from each other, one for engagement with the portion of the mold from which the container is to be stripped and the other for engagement with the container, said last-referred-to member being formed of portions which are relatively movable in a direction crosswise of said container and are adapted to lap portions of the latter, and means for effecting relative movement of said members to perform the stripping function, said portions extending generally in the direction of relative movement of said members and being bodily adjustable toward and away from each other to adapt the apparatus for stripping of containers of different sizes.

11. In apparatus for separating containers of relative fragile material from a mold portion associated therewith, the combination of members relatively movable toward and away from each other, one for engagement with the portion of the mold from which the container is to be stripped and the other for engagement with the container, said last-referred-to member being formed of portions which are relatively movable in a direction crosswise of said container and are adapted to lap portions of the latter, means for effecting relative movement of said members to perform the stripping function, said portions extending generally in the direction of relative movement of said members and being bodily adjustable toward and away from each other to adapt the apparatus for stripping of containers of different sizes, and releasable means holding said portions in lapped engagement with said container in the various bodily adjustments of said portions on the member with which they engage.

12. In apparatus of the character set forth, the combination of a base member for receiving the portion of the mold from which the container is to be stripped and on which the container is located, said member having portions adapted to lap the mold to hold it against movement, a head mounted to move toward and away from said member, means for actuating said head, said head being provided with series of grooves at its opposite ends, a pair of depending elements having cross pieces which engage said head at its groove portion, said cross-pieces being adjustable into any of said grooves, the lower end of said elements being provided with projections adapted to underlap portions of the container, and latching means located below the groove portion of said head for preventing the spreading of said elements in the actuation of said head.

13. In apparatus for separating containers of relatively fragile material from a mold portion associated therewith, the combination of members relatively movable toward and away from each other, one for engagement with the portion of the mold from which the container is to be stripped and the other for engagement with the container, said last-referred-to member comprising elements extending generally in the direction of relative movement of said members and supported at spaced apart points and having portions adapted to lap portions of the container, said elements being relatively movable to a position in which said portions thereof lap portions of the container as stated, and means for effecting relative movement of said members to produce the stripping function.

14. In apparatus for separating containers of relatively fragile material from a mold portion associated therewith, the combination of members relatively movable toward and away from each other, one for engagement with the portion of the mold from which the container is to be stripped and the other for engagement with the container, said last-referred-to member comprising elements extending generally in the direction of relative movement of said members and supported at points spaced apart substantially equal to the width of the container and having portions adapted to lap portions of the container, said elements being relatively movable to a position in which said portions thereof lap portions of the container as stated, and means for effecting relative movement of said members to produce the stripping function.

15. In apparatus for separating containers of relatively fragile material from a mold portion associated therewith, the combination of members relatively movable toward and away from each other, one for engagement with the portion of the mold from which the container is to be stripped and the other for engagement with the container, said last-referred-to member comprising elements extending generally in the direction of relative movement of said members and swingably mounted at spaced apart points and having portions adapted to lap portions of the container, said elements being relatively movable to a position in which said portions thereof lap portions of the container as stated, and means for effecting relative movement of said members to produce the stripping function.

16. In apparatus for separating containers of relatively fragile material from a mold portion associated therewith, the combination of a lower stationary member for engaging the portion of the mold from which the container is to be stripped and holding it during the operation of separating the container and mold, and means adapted to engage the container and move upwardly and draw the container from said portion of the mold.

17. In apparatus for separating containers of relatively fragile material from a mold portion associated therewith, the combination of a lower stationary member adapted to interlock with a portion of a mold from which the container is to be stripped, upon sliding said mold portion laterally upon said member and hold said mold portion against upward movement, and means adapted to engage the container and move upwardly and draw the container from said portion of the mold.

18. In apparatus of the character set forth, the combination of a lower stationary member adapted to have the portion of a mold from which the container is to be stripped, slid upon it and adapted to hold said mold portion during the operation of separating the container and mold, and means adapted to engage the container and move upwardly and draw the container from said portion of the mold.

19. In apparatus of the character set forth, the combination of members relatively movable toward and away from each other, one for engagement with the portion of the mold from which the container is to be stripped and the other for engagement with the container, said last-referred-to member being formed of elements mounted to have relative swinging movement crosswise of the container and adapted to lap portions of the latter, means for effecting relative movement of said members to perform the stripping operation, and releasable means engaging said elements beyond the portions thereof at which they are supported for preventing disengagement of said elements from said container.

20. In apparatus of the character set forth, the combination of members relatively movable toward and away from each other, one for engagement with the portion of the mold from which the container is to be stripped and the other for engagement with the container and comprising a head and elements swingingly mounted thereon to move in a direction crosswise of the container, said elements being adapted to lap portions of the container, the parts being so constructed and arranged that said elements extend from their points of support to their points of engagement with the container substantially parallel with the plane in which the movable one of said members moves in the separating operation, means for effecting relative movement of said members to perform the stripping function, and releasable means engaging said elements for preventing disengagement of the latter from the container.

21. In apparatus of the character set forth, the combination of members relatively movable toward and away from each other, one for engagement with the portion of the mold from which the container is to be stripped and the other for engagement with the container, said last-referred-to member comprising elements extending generally in the direction of relative movement of said members and supported at spaced apart points and having portions adapted to lap portions of the container, said elements being relatively movable to a position in which said portions thereof lap portions of the container as stated, means for effecting relative movement of said members, and releasable means engaging said elements for preventing disengagement of the latter from the container.

22. In apparatus of the character set forth, the combination of members relatively movable toward and away from each other, one for engagement with the portion of the mold from which the container is to be stripped and the other for engagement with the container, said last-referred-to member comprising swingably-mounted elements extending generally in the direction of relative movement of said members and supported at spaced-apart points and having portions adapted to lap portions of the container, said elements being relatively movable to a position in which said portions thereof lap portions of the container as stated, and said elements being so arranged that the axes about which they swing extend laterally beyond the portions of the container engaged by the said elements, means for effecting relative movement of said members to produce the stripping function, and releasable means engaging said elements for preventing disengagement of the latter from the container.

23. In apparatus of the character set forth, the combination of members relatively movable toward and away from each other, one for engagement with the portion of the mold from which the container is to be stripped and the other for engagement with the container, said last-referred-to member being formed of elements mounted to have relative swinging movement crosswise of the container and adapted to lap portions of the latter, means for effecting relative movement of said members to perform the stripping operation, and releasable means engaging said elements beyond the portions thereof at which they are supported for preventing disengagement of said elements from said container, comprising a device carried by said elements at one side of the apparatus and operatively, releasably, engaging with the elements at the other side of the apparatus.

24. In apparatus of the character set forth, the combination of members relatively movable toward and away from each other, one for engagement with the portion of the mold from which the container is to be stripped and the other for engagement with the container, said last-referred-to member being formed of elements mounted to have relative swinging movement crosswise of the container and adapted to lap portions of the latter, means for effecting relative movement of said members to perform the stripping operation, and releasable means engaging said elements beyond the portions thereof at which they are supported for preventing disengagement of said elements from said container, comprising a pair of levers extending crosswise of said elements, means pivotally supporting said levers on those of said elements which extend at one side of the apparatus, and a cross-bar carried by the other of said elements and with which the outer ends of said levers releasably interlockingly engage.

MARINO BELLO.
JACK J. BRETSON.